Aug. 16, 1966 J. W. SHAW 3,266,378
VARIABLE GAIN SOLENOID VALVE CONTROL SYSTEM
Filed June 16, 1964 2 Sheets-Sheet 1

*INVENTOR.*
JARED W. SHAW
BY
*P. H. Firsht*
ATTORNEY.

Aug. 16, 1966           J. W. SHAW           3,266,378

VARIABLE GAIN SOLENOID VALVE CONTROL SYSTEM

Filed June 16, 1964           2 Sheets-Sheet 2

INVENTOR.
JARED W. SHAW

United States Patent Office 3,266,378
Patented August 16, 1966

3,266,378
VARIABLE GAIN SOLENOID VALVE CONTROL SYSTEM
Jared W. Shaw, Redondo Beach, Calif., assignor to the United States of America as represented by the Secretary of the Navy
Filed June 16, 1964, Ser. No. 375,678
6 Claims. (Cl. 91—363)

The invention described herein may be manufactured and used by or for the Government of the United States of America for governmental purposes without the payment of any royalties thereon or therefor.

The instant invention relates generally to control systems and more particularly to a servosystem for rapidly displacing hydraulically driven pintles or metering-pins in variable-thrust liquid propellant rocket motor systems.

In the past, designers of variable-thrust rocket motors primarily have relied on servovalve control systems for controlling the flow of liquid propellant ingredients or fuels to the motor. However, the majority of such motors have been designed to provide a thrust output of over one thousand pounds. Consequently, the known servovalve systems have been considered to perform satisfactorily. However, they have not proven satisfactory for use in smaller motors such as, for example, the fifty-pound variable-thrust rocket motor, since the quiescent flow of an appropriate servovalve would approximate one-half the propellant ingredient flow used by the injector of a fifty-pound motor at full thrust. Further, it has been found desirable to utilize fuel line pressures as a source of hydraulic pressures for dictating the position of fuel metering pins or pintles. Since known servovalve systems would require fuel line pressures of over one thousand p.s.i. (pounds per square inch) in order to perform satisfactorily, they have not been found capable of functioning satisfactorily in fifty-pound variable-thrust rocket motor systems, which normally have a line pressure of approximately 200 p.s.i.

Therefore, it is the general purpose of the instant invention to overcome the aforementioned disadvantages, while improving pintle position response and resolution. This is accomplished by providing a simple and reliable control system, which functions to accurately and efficiently dictate the operative positions for a liquid fuel or propellant ingredient metering pin or pintle in a variable-thrust rocket motor, and which is capable of functioning satisfactorily in the presence of the relatively low fuel line pressures normally present in relatively smaller variable-thrust rocket motors.

An object of the present invention is to provide a simple, economic servosystem for driving a fuel metering pintle, and which is sensitive to pintle position error and capable of functioning with high resolution and rapid response for positioning the pintle to a selected position.

Another object is to provide a pintle control system which sums a variable pintle position feedback signal with a variable pintle control input signal to provide solenoid valve control pulses of various widths for dictating the opening and open periods for each valve of a pair of pintle control solenoid valves connected in a fluid conduit adapted for hydraulically driving a pintle to a position determined by the pintle control input signal.

A further object is to provide a system controlled electronic circuit for providing a series of solenoid valve opening pulses of variable pulse widths to a solenoid valve and means for dictating the width of each pulse in response to predetermined conditions imposed on the system.

Yet another object is to provide a simple and light weight, variable gain solenoid servosystem for selectively controlling a pintle's position with rapid response and high resolution.

Still a further object of the present invention is to provide in a hydraulically driven pintle position control system an electronic circuit for applying a series of pulses across a fluid flow control solenoid valve with each pulse having a high voltage leading portion and a low voltage trailing portion of a width dictated by pintle position error.

Still another object is to provide a unique electronic circuit capable of substantially reducing the time normally required for opening and closing a pair of solenoid valves, in a high-response servosystem, by applying across the coils of the valves pulses having high voltage leading portions of predetermined widths and a trailing portion of variable widths.

Other objects, advantages and novel features of the invention will become apparent from the following detailed description of the invention when considered in conjunction with the accompanying drawings wherein:

FIG. 1 comprises an over-all block diagrammatic view of the servosystem of the instant invention;

Figure 1:
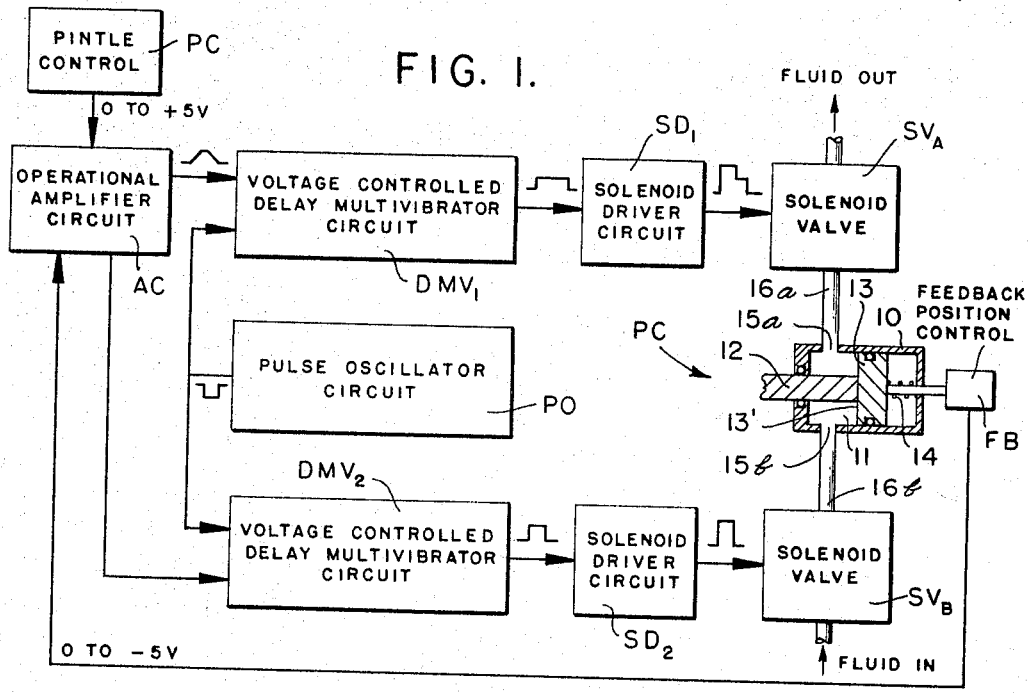

Referring now to the drawings, wherein like reference characters designate like or corresponding parts throughout the several views, there is shown in FIG. 1 an overall schematic view of the servosystem of the instant invention, including a fuel metering pintle control unit PC, the displacement of which is dictated by a pair of solenoid valves $SV_A$ and $SV_B$ and detected by a feedback position control unit FB. The solenoid valve $SV_B$ is connected in a pressurized hydraulic line, which may comprise the rocket motor's pressurized fuel line. The solenoid valve $SV_A$ is of a design and functions in a manner similar to the solenoid valve $SV_B$ and is disposed in the pintle control's hydraulic return line for exhausting the pintle control unit PC. The solenoid valves $SV_A$ and $SV_B$ are controlled by solenoid driver circuits comprising circuits $SD_1$ and $SD_2$, respectively, which function in a similar manner under the dictates of a pair of similar voltage controlled delay multivibrator circuits $DMV_1$ and $DMV_2$. The circuits $DMV_1$ and $DMV_2$ function to provide input pulses to the circuits $SD_1$ and $SD_2$. The circuits $SD_1$ and $SD_2$ respond to the input signals for causing the valves $SV_A$ and $SV_B$ to dither simultaneously, but which may vary the operation of the valve to correct pintle position error by causing one of the valves $SV_A$ and $SV_B$ to remain open for a longer time period than the other valve is held open in response to variations in pulse widths of the pulses applied from the multivibrator circuits $DMV_1$ and $DMV_2$.

Each of the multivibrators circuits $DMV_1$ and $DMV_2$ are connected with a constant rate pulse oscillator circuit PO, which serves to activate the circuits $DMV_1$ and $DMV_2$ simultaneously and at a constant rate for causing these circuits to provide the pulses to the circuits $SD_1$ and $SD_2$ in a simultaneous manner. However, where pintle position correction is required an operational amplifier circuit AC provides and alternately directs a pulse modifying signal to one or the other of the multivibrator circuits $DMV_1$ and $DMV_2$ for altering the width of the pulses provided thereby.

The amplifier circuit AC is provided with a sum circuit, which serve to add a 0 to +5-volt input signal obtained from a selectively operable pintle position control unit PC, and a 0 to −5-volt pintle position feedback signal obtained from the feedback position control unit FB to provide an error signal or an amplifier input signal for causing the amplifier circuit to select one of the two multivibrator circuits and direct a pulse modifying output signal thereto. The ultimate result obtained through applying to the amplifier circuit AC an input signal, comprising a sum of the signals obtained from the pintle control unit PC and the feedback position control unit FB, is a driving of the pintle 12 to a selected position wherein the feedback signal and the input signal, when added, will substantially negate the effects of the other. At this position the valves $SV_A$ and $SV_B$ will be caused to operate or dither simultaneously at a rate dictated by the pulse oscillator circuit PO, for thereby maintaining the pintle 12 in a realtively fixed position.

*Pintle control*

The pintle control unit PC includes a housing 10 having a pintle cavity or pressure chamber 11. Mounted within the chamber 11 there is a reciprocating pintle 12 fixed to one face of a reciprocating head or head-like member 13 having a pressure face 13' against which the fluid serving as the system's hydraulic fluid may act for retracting the pintle 12. At the opposite side of the head-like member 13 is a compression spring 14 which serves to bias the head 13 in a pintle extending direction under the influence of the spring's recovery forces.

The pintle 12 is provided with a metering device (not shown), serving to control the rate of flow of liquid fuels or propellant ingredients in a variable-thrust rocket motor. As designed, the pintle 12 is provided with a .010-inch full stroke. Consequently, the pintle stroke will be relatively short thus permitting the spring to be so designed as to maintain a substantially constant predetermined pressure on the fluid in the chamber 11. For example, where the fuel line pressure is to be 200 p.s.i., the spring 14 may be of a value capable of maintaining the pressure of the fluid in the chamber 11 at a constant 100 p.s.i. and thus affording the system a constant hydraulic gain and high piston position resolution.

The chamber 11 is provided with a fluid outlet or discharge port 15a and a fluid inlet or intake port 15b through which a fluid flow may be established through the chamber 11. A fluid flow control of the fluid flow directed into and out of the chamber 11, from a pressure source and to an exhaust respectively, is maintained by the valves $SV_A$ and $SV_B$. These valves communicate with the ports 15a and 15b of the chamber 11 through fluid conduits or tubing 16a and 16b.

For constantly detecting the position of the pintle 12, there is provided within the feedback position control unit FB a suitable transducer, which constantly monitors the position of the pintle 12 and provides a feedback signal indicative of its extension relative to a pintle-closed position. The particular device utilized in the unit FB may be varied, however, it is to be understood that the unit FB comprises a suitable transducer connected with the pintle 12 to provide an output signal having a voltage value ranging between 0 and −5 volts as pintle displacement occurs. This feedback signal is directed to the amplifier circuit AC and utilized in a manner as will hereinafter be more clearly set forth.

*Solenoid valves*

The solenoid valves $SV_A$ and $SV_B$ may be of any suitable design having an inductance coil for driving the valves to an open condition when an electrical pulse is applied thereacross and a spring biased closing means for closing the valve. The valves presently utilized are of a type designed to open to a fully open condition in 4.5 ms. (milliseconds) and closed in 8 ms., for a total valve time of 12.5 ms., when a voltage of 28 volts at one ampere is applied across the inductance coils.

With the hereinafter described control circuit the valve opening time may be reduced to 3 ms. and the closing time reduced to 5 ms. for a substantially reduced total valve time of 8 ms. It is to be understood that the total time for completing a valve cycle may vary according to the design of the particular valve utilized in the system. Hence, by utilizing "faster" valves total valve time may be further reduced.

Since, as is known, higher voltage values serve to reduce the opening time required for opening solenoid valves, and lower voltages serve to reduce the time required for closing the valves, the servosystem of the instant invention is provided with the pair of solenoid driver circuits $SD_1$ and $SD_2$, each of which apply, across a connected one of the solenoid valve coils $SD_1$ and $SD_2$, a pulse having a high-voltage leading portion, of a predetermined width, and a low-voltage trailing portion having a width determined by an output signal applied from a connected one of the voltage controlled delay multivibrator circuits $DMV_1$ and $DMV_2$.

Figure 2:
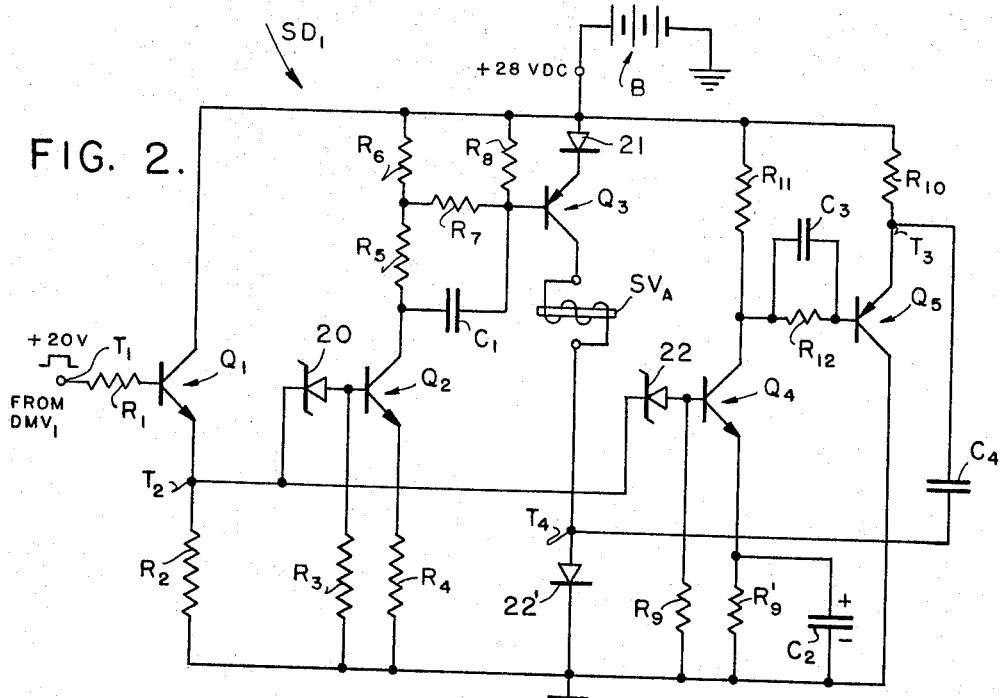
FIG. 2 is a functional schematic view of the solenoid driver circuit $SD_1$ of FIG. 1.

Since the solenoid driver circuits $SD_1$ and $SD_2$ are of similar design and function in a like manner, a detailed description of the solenoid driver circuit $SD_1$, FIG. 2, is deemed sufficient to provide a complete understanding of the present invention.

*Solenoid driver circuit*

The solenoid driver circuit $SD_1$ is designed to apply an initial 48-volt operative potential across the solenoid valve $SV_A$ for a time period sufficient to drive the valve $SV_A$ to a fully open condition and, where required, a subsequent suitable holding voltage, for example, approximately 16 volts, for holding the valve $SV_A$ open for a period of time determined by the width of the input pulse applied from the multivibrator circuit $DMV_1$.

The solenoid driver circuit $SD_1$, FIG. 2, is provided with an input terminal $T_1$ connected with the delay multivibrator circuit $DMV_1$ and further connected to the base of an NPN transistor $Q_1$ through a 4.7K (kilohm) fixed resistance $R_1$. The collector of the transistor $Q_1$ is connected to a +28 v. D.C. (volt direct current) source of operative potential B with the emitter thereof being connected to a source of ground potential G through a 10K fixed resistance $R_2$. Disposed between the resistance $R_2$ and the emitter of $Q_1$ is a junction terminal $T_2$ at which the base of a normally reversed biased NPN transistor $Q_2$ is connected to the emitter of transistor $Q_1$. Transistor $Q_2$ is reversed biased through base-connected fixed resistance $R_3$ connected to ground. Transistor $Q_1$ acts as an impedance matching device to keep the circuit $SD_1$ from loading the circuit $DMV_1$. The amplitude of the pulse to be applied at terminal $T_2$ is about +20 volts. A 12-volt zener diode 20 is interposed between the base of transistor $Q_2$ and terminal $T_2$, whereby the pulse applied at the base of $Q_2$ is a +10-volt pulse, amply sufficient for turning on $Q_2$ and for thus causing it to conduct.

The emitter of $Q_2$ is connected to ground through a 240-ohm resistance $R_4$, while the collector thereof is connected to the source of operative potential B through a fixed resistance network including a pair of 470-ohm resistors $R_5$ and $R_6$, a 20K resistor $R_7$ and a 1.5K resistor $R_8$. The collector of the NPN transistor $Q_2$ is further connected to the base of a normally reversed biased PNP transistor $Q_3$ through a 5.6-microfarad capacitor $C_1$ in order that the transistor $Q_3$ may be turned on "hard" when the transistor $Q_2$ is caused to become forward biased and the collector thereof is caused to undergo a drop in voltage. The capacitor $C_1$ will discharge as the valve $SV_A$ opens and will be fully discharged shortly thereafter. After the capacitor $C_1$ is discharged, the transistor $Q_3$ will continue to conduct a limited current due to the bias imposed through the base-connected resistance network so long as $Q_2$ remains forward biased.

The normally reverse biased transistor $Q_3$ serves to couple a first side of the coil of the solenoid valve $SV_A$ with the source of operative potential B through a unilaterally conducting device or diode 21, which functions to reduce the emitter voltage of $Q_3$ to .5 volt less than B+ voltage, as applied from the source of potential $B_1$, for purposes of accommodating a turning off of $Q_3$. Consequently, the leading portion of the pulse applied to the coil of the solenoid valve $SV_A$ from the source of potential B will approximate +28 volts while the trailing portion thereof will be substantially diminished due to the current limiting effects of $Q_3$ for permitting the solenoid valve $SV_A$ to close in about 3 ms. after the voltage is removed. A voltage of +16 volts has been found to be satisfactory for maintaining the valve open while allowing it to close rapidly upon removal of the voltage from the coil.

In order to establish a current through the coil of the solenoid valve $SV_A$, when a 20-volt pulse is applied at the terminal $T_2$, the base of a further normally reverse biased NPN transistor $Q_4$ is connected at $T_2$ through a second 12-volt zener diode 22. Therefore, a positive or forward biasing pulse may be applied to the base of $Q_4$ simultaneously with an application of a forward biasing pulse to the base of the transistor $Q_3$. The transistor $Q_4$ is reversed biased through 2K resistance $R_9$ connected between the base thereof and the source of ground potential G. The collector of the NPN transistor $Q_4$ is connected with the +28 v. D.C. source of operative potential B through a one K resistance $R_{11}$, while the emitter thereof is connected to ground through an R-C network, including a 200-ohm resistor $R'_9$ and a 47-microfarad capacitor $C_2$ which serves to impose a negative charge on the emitter of transistor $Q_4$. Therefore, when a 20-volt pulse is applied at $T_2$, transistor $Q_4$ is turned on "hard" causing its collector voltage to drop to provide a negative 28-volt output pulse. This negative pulse is applied to the base of a further normally reverse biased PNP transistor $Q_5$, or current amplifier, across a 5.6-microfarad capacitor $C_3$ for causing $Q_5$ to become forward biased. The collector of $Q_5$ is connected to ground potential, while the emitter thereof is connected through a 100-ohm resistance $R_{10}$ to the source of operative potential B, and the base thereof is connected to the collector of the transistor $Q_4$ through a 15K biasing resistor $R_{12}$ arranged in circuit parallel with the capacitor $C_3$. The output of the transistor $Q_5$ will have an amplitude of a negative 20 volts which may be applied to the second side of the coil of $SV_A$ from a terminal $T_3$ connected with the transistor emitter.

The second side of the coil of the solenoid valve $SV_A$ is connected to a terminal $T_4$, which is connected to the emiter of the transistor $Q_5$ through a 10 microfarad capacitor $C_4$ and the terminal $T_3$ so that during the periods that transistors $Q_4$ and $Q_5$ are forward biased, a negative 20-volt pulse will be applied across the capacitor $C_4$ to the terminal $T_4$. The terminal $T_4$ is also connected with the source of ground potential G, however, a unilateral conducting device or diode 22' is interposed therebetween and serves to block the applied negative 20-volt pulse. Therefore, the negative 20-volt pulse will be applied to the second side of the coil of the solenoid valve $SV_A$ so that a total of 48 volts will be applied thereacross as the transistor $Q_3$ applies a +28 volts to the first side thereof. Once the solenoid valve $SV_A$ is opened and the capacitors $C_1$, $C_3$ and $C_4$ have discharged, the potential applied across the valve's coil will drop as ground potential is applied at the second side of the coil of the valve $SV_A$. At this time a +16-volt voltage will appear across the coil of the valve. This voltage will be maintained so long as the transistor $Q_2$ is forward biased, and the transistor $Q_2$ will remain forward biased only so long as a positive pulse is applied from the circuit $DMV_1$ to the base of the transistor $Q_1$.

Figure 3:
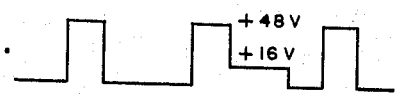
FIG. 3 is a diagrammatic view illustrating a series of pulses of the type which may be applied across the solenoid valves by the solenoid driver circuits of FIG. 1.

Therefore, it is to be understood that the output pulse from the voltage controlled delay multivibrator circuit $DMV_1$ comprises a solenoid driving circuit input pulse serving as a trigger pulse for causing the solenoid driving circuit $SD_1$ to apply across the coil of the solenoid valve $SV_A$ a pulse having a 48-volt leading portion of width of approximately 3 ms., for driving the solenoid valve $SV_A$ open, and a trailing portion of 16 volts, varying in width from 0 to several ms., FIG. 3, as dictated by the width of the input trigger pulse, for holding the solenoid valve $SV_A$ open. By utilizing a +16-volt trailing portion the solenoid valve is permitted to close in 5 ms. after the removal of the +16-volt portion of the pulse. Hence, the valve $SV_A$ may be fully opened under 48 volts within 3 ms., held open for a required time by 16 volts, and closed in 5 ms., thus establishing a total valve time of 8 ms.

*Voltage controlled multivibrator circuits*

Figure 4:
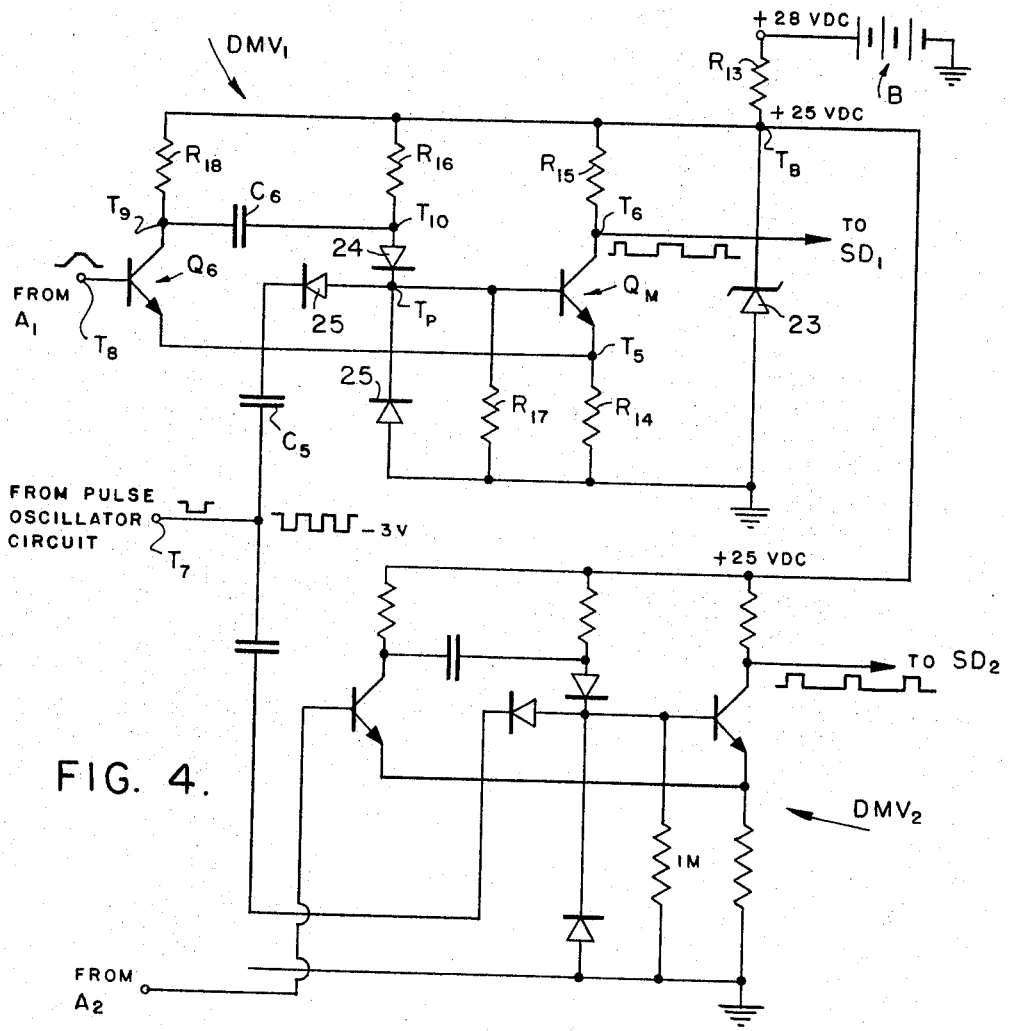
FIG. 4 is a functional schematic view of the two voltage controlled delay multivibrator circuits diagrammatically illustrated in FIG. 1.

As aforedescribed, the voltage controlled multivibrator circuits $DMV_1$ and $DMV_2$, FIG. 4, each serve to provide a series of solenoid driver circuit input pulses, or trigger pulses, to the solenoid driver circuits $SD_1$ and $SD_2$, respectively. The width of the solenoid driver input pulses may be varied upwardly to 15 ms. from a constant width of .5 ms. with a 20 ms. period when a negative pulse output from the pulse oscillator circuit PO is provided at a constant fifty c.p.s. (cycles per second) rate and applied thereto. This variation may be effected by varying the amplifier circuit output signal to the multivibrator circuits from a threshold voltage of a +1.1 volts to a maximum voltage of +2.1 volts.

The voltage-controlled delay multivibrator circuits $DMV_1$ and $DMV_2$ function in a similar manner. Therefore, a detailed description of the voltage controlled delay multivibrator circuit $DMV_1$ is deemed sufficient to provide an understanding of the design, operation and function of both of the circuits. However, it is to be understood that each of the multivibrator circuits $DMV_1$ and $DMV_2$ are simultaneously triggered by a negative input pulse obtained from the pulse oscillator circuit PO, and the variation in pulse width of the pulsed output therefrom, to the solenoid driver circuits $SD_1$ and $SD_2$, respectively, is dictated by separate amplifiers $A_1$ and $A_2$, FIG. 5. The amplifiers $A_1$ and $A_2$ are arranged within the amplifier circuit AC, as will hereinafter be more fully described, and serve to provide positive output signals, or multivibrator control signals, ranging between +1.1 volts and +2.1 volts.

The circuits $DMV_1$ and $DMV_2$ are connected with the +28 v. D.C. source of voltage B, which is dropped across a 200-ohm resistance $R_{13}$ to provide an operative potential of +25 v. D.C. at terminal $T_B$. Further, a 25-volt zener diode 23 is connected between the terminal $T_B$ and ground potential in order to assist in the elimination of output pulse width variations as may be initiated through possible source voltage fluctuations.

The voltage controlled delay multivibrator circuit $DMV_1$ is similar to a standard emitter coupled delay multivibrator circuit except that the base of the normally "off" transistor, comprising an NPN transistor $Q_M$ in the present invention, is connected with the source of operative potential B, at a junction terminal $T_P$, whereby the transistor $Q_M$ may be normally forward biased and selectively turned off, or reversed biased, in order to effect pulse duration control for the circuit's output pulse to circuit $SD_1$. The emiter of the transistor $Q_M$ is connected to ground potential through a junction terminal $T_5$ and a 510-ohm resistance $R_{14}$, while the collector thereof is coupled to the +25 v. D.C. potential through a 3.9K resistance $R_{15}$.

The terminal $T_P$ is coupled to the +25 v. D.C. source of potential B through a 100K resistance $R_{16}$ and a unilaterally conducting diode 24. Therefore, a forward biasing signal may be applied to the base of transistor $Q_M$ through the terminal $T_P$. The terminal $T_P$ is also connected to ground potential through a diode 25 and a one megohm resistance $R_{17}$ so that a current may be conducted therethrough.

Since the transistor $Q_M$ is normally forward biased, a negative pulse applied to terminal $T_P$ will serve to cause transistor $Q_M$ to become reverse biased for causing a voltage rise to occur at terminal $T_6$ to provide an output pulse to the circuit $SD_1$ of a width dictated by the width of the negative pulse applied to terminal $T_P$. Therefore, the terminal $T_P$ is connected with an output terminal $T_7$ of the pulse oscillator circuit PO through a .05 microfarad capacitor $C_5$ and a unilaterally conducting device or diode 25, whereby a negative 3-volt pulse may be applied to the base of the transistor $Q_M$.

As hereinbefore mentioned, the output from the pulse oscillator circuit PO comprises a constant rate negative 3-volt pulse. Consequently, each time the pulse oscillator circuit PO provides a negative 3-volt pulse, or trigger pulse, to the terminal $T_7$, a voltage drop occurs at terminal $T_P$ causing the transistor $Q_M$ to turn off so that a positive output pulse, having a width dictated by the width of the negative 3-volt pulse applied to terminal $T_P$, is directed from the terminal $T_6$ to the solenoid driver circuit $SD_1$.

Figure 5:
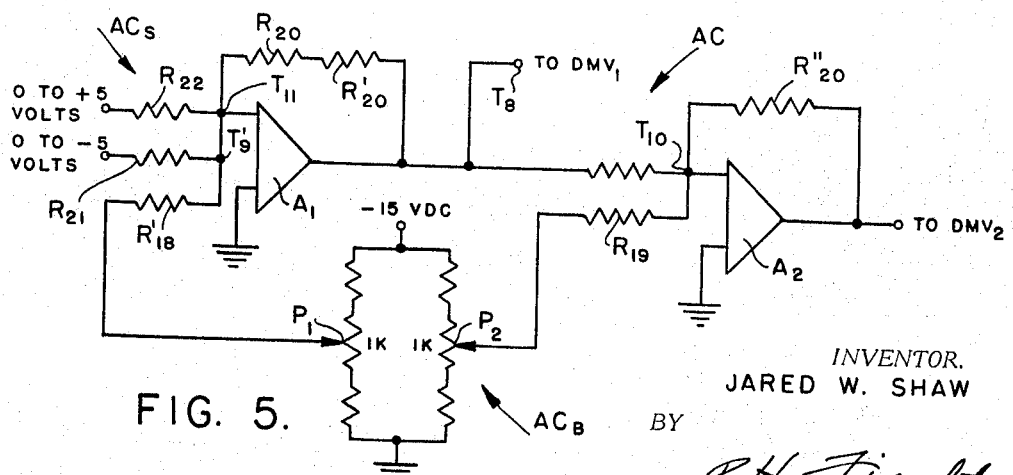
FIG. 5 is a functional diagrammatic view of the operational amplifier circuit illustrated in FIG. 1.

However, it is necessary to provide means for effectively varying the width of the pulses applied to the circuit $SD_1$ for controlling the operation of the solenoid valve $SV_A$, for the reasons hereinbefore set forth. Therefore, the output from the amplifier $A_1$, of the amplifier circuit AC, FIG. 5, is connected at the base terminal $T_8$, of an NPN transistor $Q_6$ arranged within the multivibrator circuit $DMV_1$. The transistor $Q_6$ will turn on when a positive 1.1 voltage signal is applied to the terminal $T_8$ from the amplifier circuit AC, and is intended to conduct at an operative maximum when the amplitude of the applied voltage attains a value of +2.1 volts.

The collector of the transistor $Q_6$ is connected with the +25 v. D.C. potential through a 3.9K resistance $R_{18}$ while the emitter thereof is connected to the terminal $T_5$. The transistor $Q_6$ will become forward biased when a positive going signal of 1.1 volts or more is applied to terminal $T_8$. The transistor $Q_6$ will remain in a forward biased state until the amplifier signal drops beliw 1.1 volts. It is to be understood, however, that the greater the voltage amplitude of the amplifier output signal applied to the terminal $T_8$, the heavier transistor $Q_6$ will be caused to conduct. Hence, the voltage drop caused to occur at the collector of the transistor $Q_6$ will be dictated by the amplitude of the positive voltage applied at the terminal $T_8$.

Connected to the collector of transistor $Q_6$ is a terminal $T_9$ to which one side of a .33 microfarad capacitor $C_6$ is connected. The other side of the capacitor $C_6$ is connected at a terminal $T_{10}$ disposed between the resistance $R_{16}$ and the diode 24. Consequently, the capacitor $C_6$ will be caused to discharge to terminal $T_P$, through the diode 24 as the transistor $Q_6$ becomes forward biased. This discharge causes a voltage drop to occur at the terminal $T_P$ and thereby establish a reverse bias for the transistor $Q_M$.

Therefore, when the transistor $Q_M$ is turned off, through an application of a negative 3-volt pulse from the pulse oscillator circuit to terminal $T_P$, and a positive output signal from the amplifier $A_1$ is applied to the terminal $T_8$, $Q_6$ will be turned on "hard" causing its collector voltage to drop and capacitor $C_6$ to discharge to terminal $T_P$ and maintain a reverse bias on the transistor $Q_M$. The length of time taken for capacitor $C_6$ to discharge depends directly upon the gain of the transistor $Q_6$. Therefore, the greater the amplitude of the input signal to terminal $T_8$, the greater will be the width of resulting pulses provided at terminal $T_6$.

It is to be noted that the resistance $R_{14}$ may be replaced by a variable resistance in order to effectively control the gain of the transistor $Q_6$ so that the pulse duration of the output from the two multivibrator circuits $DMV_1$ and $DMV_2$ may be equalized over their operative range.

Pulse oscillator circuit

The pulse oscillator circuit PO, FIG. 1, may be of any suitable design. Since such circuits are well-known, a detailed description of the pulse oscillator circuit PO is not deemed necessary to provide an understanding of the instant invention. However, the device presently utilized comprises a known unijunction RC oscillator circuit so biased as to be capable of providing a 3-volt negative pulsed output. The repetition rate of the circuit PO may be selectively varied between 50 and 500 c.p.s. for activating or triggering both of the delay multivibrator circuits $DMV_1$ and $DMV_2$ at a constant and predetermined rate and in a simultaneous manner.

Therefore, it is to be understood that each 3-volt negative output pulse from the pulse oscillator circuit PO will be provided to each of the circuits $DMV_1$ and $DMV_2$ simultaneously, and at the same voltage level, so that both of the delay multivibrator circuits $DMV_1$ and $DMV_2$ will be simultaneously activated. In the absence of an input from the amplifier circuit AC, to either of the multivibrator circuits, the input pulses to both solenoid driver circuits $SD_1$ and $SD_2$ are equal in width for causing the solenoid valves $SV_A$ and $SV_B$ to open and close simultaneously, whereby the position of pintle 12 will remain substantially unchanged as the circuits are activated in unison to cause substantially equal quantities of fluid to be directed into and out of the chamber 11.

Operational amplifier circuit

The amplifier circuit AC, FIG. 5, includes an amplifier biasing circuit $AC_B$ a sum circuit $AC_S$ and a first and second amplifier $A_1$ and $A_2$.

Each of the amplifiers $A_1$ and $A_2$ comprises a solid state, differential operational amplifier, type $P_2$, produced by George Philbrick Researches, Incorporated. The input signal to each amplifier is floating with respect to ground, while the output signal therefrom is 180 degrees out of phase with respect to the input thereto. The amplifiers $A_1$ and $A_2$ are adjusted through the biasing circuit $AC_B$, to provide an output signal voltage ranging from +.1 to +2.1 volts as the amplitude of input signal to amplifier $A_1$ is varied between ±5 volts.

The biasing circuit $AC_B$ includes series connected resistances and a pair of potentiometers $P_1$ and $P_2$ connected between ground potential and a negative 15 v. D.C. source of potential. The output signal from each of the potentiometers $P_1$ and $P_2$ is dropped across fixed resistances $R'_{18}$ and $R_{19}$, respectively, and combined with the amplifier input signals at terminals $T'_9$ and $T_{10}$, respectively. Further, feedback resistances, including a variable resistance $R_{20}$ and fixed resistance $R'_{20}$, and a fixed resistance $R''_{20}$ are connected between the output of the amplifiers $A_1$ and $A_2$, respectively, and the input thereto and aid in adjusting the associated amplifier. Hence, the output of each amplifier may be adjusted in a well-known manner to provide output signals conforming to the desired voltage range for the range of applied input signal voltages.

The sum circuit $AC_S$ includes a fixed resistance $R_{21}$ connected between the terminal $T'_9$ and the feedback position control unit or device FB. The feedback signal, or output voltage obtained from the unit FB increases in a negative direction as the pintle 12 is displaced from a closed or fuel blocking disposition to maximum displacement, and is dropped across the fixed resistance $R_{21}$. Consequently, as the pintle 12 is displaced from a closed position to a fully displaced position, a negative going 0 to −5-volt signal is applied from the feedback unit FB to the terminal $T'_9$.

A further terminal $T_{11}$ is connected between the terminal $T'_9$ and the input terminal of the amplifier $A_1$ and serves as the input terminal to which the voltage from the pintle control unit PC is applied.

The pintle control unit PC comprises any suitable transducer including a mechanical linkage, which may be selectively displaced for providing a positive going output signal as the linkage is displaced from a first to a second position. Connected between the pintle control unit PC and the terminal $T_{11}$ is a fixed resistance $R_{22}$, which serves to drop the positive going signal voltage, as directed from the control unit PC, so that a pintle control output signal ranging from 0 to +5 volts may be applied at terminal $T_{11}$.

Hence, it is to be understood that a 0 to −5-volt signal, applied from the feedback position control unit FB, is added to the 0 to +5-volt signal, applied from the pintle control unit PC, to provide an input to the first differential operational amplifier $A_1$ causing it to provide an output signal having a voltage amplitude ranging between a +1 volt for a maximum positive input voltage, to a +2.1 volts, for a maximum negative input voltage. Hence, a 0 to −5-volt input signal voltage to amplifier $A_1$ will cause the amplifier to provide a +1.1 to +2.1-volt output signal, and a 0 to +5-volt input signal will produce a negative going +1.1 to +.1-volt output signal from amplifier $A_1$.

The output of amplifier $A_1$ is connected with the terminal $T_8$ of the delay multivibrator circuit $DMV_1$ so that the output pulses from the circuit $DMV_1$ will control the amplifier $A_1$ as the output voltage therefrom varies from +1.1 volts to +2.1 volts. However, if the input to the amplifier $A_1$ is positive, the output therefrom will be less than +1.1 volts and the delay multivibrator circuit $DMV_1$ will not be effected by the amplifier circuit's output.

The output signal of amplifier $A_1$ is also fed to the input of amplifier $A_2$. If the input to amplifier $A_1$ comprises a 0 to +5-volt signal, the output thereof will be a negative going +1.1 to +.1 volt, as hereinbefore mentioned. This voltage is inverted and biased in the amplifier $A_2$, which acts as a phase inverter, to provide a positive going +1.1 to a +2.1 volts for controlling the delay multivibrator circuit $DMV_2$. The output of amplifier $A_2$ will be less than +1.1 volts, cutting off $DMV_2$, when the input to the amplifier $A_1$ is negative. Thus a negative input signal to the amplifier $A_1$ controls $DMV_1$, while a positive input thereto controls $DMV_2$, and a zero voltage input signal will result in no multivibrator circuit control being exercised.

*Operation*

The operation of the present invention is hereinafter summarized with reference being made again particularly to FIG. 1.

Assuming the pintle 12 to be positioned at a preselected "control" position wherein a desired quantity of rocket propellant or fuel is being passed thereby, a mutually canceling signal voltage will be applied from the pintle control unit PC and the unit FB to the amplifier circuit AC. Hence, the voltage controlled multivibrator circuits $DMV_1$ and $DMV_2$ respond simultaneously to the input signal directed from the pulse oscillator circuit PO and provide pulsed output signals of equal pulse widths to the solenoid driver circuits $SD_1$ and $SD_2$, which activate the valves $SV_A$ and $SV_B$ causing them to dither in unison, whereby the fluid flow into the chamber 11 approximates fluid flow therefrom, for thus establishing a fixed displacement position for the pintle 12.

In the event that it becomes desirable to reposition or extend the pintle 12, under the influence of the recovery forces of the spring 14 so that less fuel may be metered to the associated rocket motor, the pintle control unit PC is adjusted in a determinable manner so that it now applies to the amplifier circuit a signal voltage of a reduced or lesser amplitude. As the signal voltage from the unit FB remains constant, a resulting negative input signal voltage is applied to the amplifier $A_1$ of the amplifier circuit AC. This negative voltage serves to initiate a positive signal voltage output from the amplifier $A_1$ of the circuit AC, which is directed to the terminal $T_8$ of the voltage controlled delay multivibrator circuit $DMV_1$. The circuit $DMV_1$ responds to this input from the amplifier circuit AC by increasing the pulse width of its pulsed output signal to the solenoid driver circuit $SD_1$. The circuit $SD_1$ responds to the increased pulse width by maintaining the solenoid valve $SV_A$ open for an increased time period before it allows the valve to close under the influence of the valve's spring. Hence, an increase in the quantity of fluid passed from the chamber 11, in response to an increase in a single pulse width, is experienced.

Since the voltage controlled delay multivibrator circuit $DMV_2$ is unaffected by the change in the signal voltage output from the amplifier circuit, the solenoid valve $SV_B$ continues to open and close at the rate experienced before the change in the amplitude of the signal voltage obtained from the pintle control unit PC. The initiated valve operation difference now causes a decrease in the quantity of fluid retained in chamber 11. However, as the fluid pressure tends to decrease at the face 13′ of the head-like member 13, the compressed compression spring 14 is permitted to recover allowing the member 13 to be displaced or extended under the influence of the recovery forces of the spring 14, thus causing the pintle 12 to extend in a pintle-closing direction. As the member 13 is displaced in the unit FB detects the displacement and provides a negative output signal voltage of a lesser amplitude. Once the amplitude of the algebraically added output signals, from the units FB and PC, serve to essentially cancel each other, a zero voltage output is provided by both of the amplifiers of the amplifier circuit AC, whereupon the valves $SV_A$ and $SV_B$ again dither in unison and the position of the pintle 12 is again stabilized.

In order to retract the pintle 12, the pintle control unit PC is adjusted in a manner to provide an increased positive voltage therefrom for causing the solenoid valve $SV_B$ to remain open for a longer period, in the manner similar to that hereinbefore described, whereby the head-like member 13 may be displaced to compress the spring 14 and retract the pintle 12 under the influence of an increase in the quantity of fluid retained in the chamber 11. This increase is due to the fact that the valve $SV_B$ will now be held open for periods of time longer than will be the valve $SV_A$.

Obviously, many modifications and variations of the present invention are possible in the light of the above teachings. It is therefore to be understood that within the scope of the appended claims the invention may be practiced otherwise than as specifically described.

What is claimed is:

1. A pintle control system including in combination:
   a displaceable pintle;
   a fluid pressure means including a pressure chamber and a displaceable head mounted therein and operatively associated with said pintle for displacing the pintle in accordance with changes in fluid pressure operatively established within said chamber;
   electrical circuit feedback means operatively associated with said pintle and adapted to monitor pintle displacement and provide pintle position feedback signals indicative of displacement imparted to said pintle;
   fluid pressure control means for initiating fluid pressure changes within said chamber including a pair of fluid flow control solenoid valves disposed at opposite sides of said chamber and communicating therewith through fluid conduits for operatively controlling the quantity of fluid delivered to and retained in said chamber;
   two solenoid driver circuits, each being singly connected with one of said solenoid valves and adapted to be activated in response to input pulses for opening the connected valve and subsequently retaining the valve in an open condition for a time period as dictated by the width of said pulses to accommodate an establishment of a fluid flow between the connected solenoid valve and the fluid pressure chamber, and further adapted to be inactivated in the absence of a pulse for accommodating a closing of the connected valve to interrupt said fluid flow;

two voltage controlled delay multivibrator circuits, each being singly connected with one of said driver circuits and adapted to be activated for providing to said one solenoid driver circuit input pulses of a variable width;

a pulse oscillator circuit coupled with the two voltage controlled delay multivibrator circuits for simultaneously providing a series of pulses to the delay multivibrator circuits for simultaneously activating the two multivibrator circuits in unison;

an amplifier circuit connected with the two multivibrator circuits adapted to alternatively direct a pulse duration control signal to one of the two multivibrator circuits in accordance with an amplifier input signal for dictating the pulse width of the solenoid driver circut input pulses;

a selectively positioned pintle control transducer adapted to be selectively positioned for providing a selectively variable pintle control output signal; and means connected with the feedback means and the pintle control transducer for summing the pintle position feedback signal and the pintle control output signal to provide an amplifier input signal to said amplifier circuit, whereby the voltage value of the amplifier input signal may be established in accordance with the pintle's position and the pintle control transducer setting for varying the period of open condition for one of said solenoid valves to effectively initiate pintle displacement.

2. The control system of claim 1, further characterized in that each of said solenoid driver circuits includes:

voltage applying means for applying an initial solenoid valve driving voltage of a given magnitude across the inductance coil of a connected solenoid valve during given valve-opening periods and a subsequent solenoid valve driving voltage of a reduced magnitude across the valve during given valve-open periods, whereby the valve may be opened through an application of a relatively high voltage and retained opened through an application of a relatively low voltage for accommodating a rapid opening and closing of the valve.

3. The control system of claim 2 further characterized in said voltage applying means includes:

a first NPN transistor having its collector connected with a positive twenty-eight-volt source of operative potential, its emitter connected with ground potential through a fixed resistance, and its base connected with the output terminal of one of said voltage controlled delay multivibrator circuits;

a second NPN transistor having its collector connected with said positive source of operative potential through a fixed resistance network, its emitter connected to ground potential through a fixed resistance, and its base connected to ground potential through a biasing resistor, for applying a reverse biasing voltage thereto;

means including a zener diode further connecting the base of said second NPN transistor to the emitter of said first NPN transistor for applying a forward biasing voltage thereto;

a first PNP transistor having its collector connected to a first side of the inductance coil of one valve of said pair of solenoid valves, its emitter connected to said positive source of operative potential through a diode and its base connected with said resistance network, for applying a reverse biasing voltage thereto, and to the collector of said second NPN transistor through a capacitor, for applying a forward biasing voltage thereto;

a third NPN transistor having its collector connected to said positive source of operative potential through a fixed resistance, its emitter connected with ground potential through an R-C biasing network, its base connected with ground potential through a fixed resistance, for applying a reverse biasing voltage thereto, and to the emitter of said first transistor through a zener diode, for applying a forward biasing voltage thereto;

a second PNP having its emitter connected with said positive source of operative potential through a fixed resistance, its collector connected with ground potential, and its base connected with a further resistance network, for applying a reverse biasing voltage thereto, and the collector of said third NPN transistor through a capacitor for applying a forward biasing voltage thereto; and means connected with a second side of said inductance coil of said one valve of said pair of solenoid valves including a signal blocking diode connecting the second side of said valve to ground potential and a capacitor connecting said second side of said coil with the emitter of said second PNP transistor, whereby the first and second PNP transistor may apply a pulse having a high-voltage leading portion and a low-voltage trailing portion across said coil of said valve in response to an application of a solenoid driver input pulse to the base of said first NPN transistor.

4. The system of claim 1 further characterized in that each of said voltage controlled delay multivibrator circuits include:

a first NPN transistor having its collector connected to a positive twenty-five-volt source of operative potential through a first fixed resistance, its base connected with an output of said amplifier circuit, and its emitter connected to ground potential through a second fixed resistance;

a second NPN transistor having its collector connected to said positive twenty-five-volt source of operative potential through a third fixed resistance, its emitter connected at a first junction terminal disposed between the emitter of said first NPN transistor and said second fixed resistance, and its base connected at a second junction terminal;

means including a signal diode connecting said second junction terminal with the output of said pulse oscillator circuit;

collector-to-base feedback means including a capacitor connecting said second junction terminal with the collector of said first NPN transistor; and a multivibrator circuit output terminal disposed between said third fixed resistance and the collector of said second NPN transistor for providing solenoid driver input pulses having variable widths as dictated by a negative input pulse applied from said pulse oscillator circuit to said second junction terminal and a positive voltage duration control signal applied to the base of said first NPN transistor from said amplifier circuit.

5. The system of claim 1, further characterized in that said amplifier circuit includes:

a first differential operational amplifier;

a second differential operational amplifier;

means connecting the output of said first amplifier to one of said two voltage controlled multivibrator circuits;

means connecting the input of said second amplifier in series with the output of said first amplifier;

means connecting the output of said second amplifier with the other one of said two voltage controlled multivibrator circuits whereby a negative input signal to said first amplifier provides a positive pulse duration control signal to said one multivibrator circuit and a positive input signal to said other one of said two voltage controlled multivibrator circuits; and means providing a constant biasing voltage to the input of said first and said second amplifiers.

6. In a control system for dictating pintle displacement for a fluid displaceable pintle, means comprising in combination:
   a fluid displaceable pintle;
   a pintle control means adapted to provide a control voltage output signal;
   a pintle position detecting means operatively associated with the pintle and adapted to provide a variable pintle position feedback output signal of a voltage value indicative of detected pintle position;
   a first differential operational amplifier;
   amplifier driving means connected with said amplifier for providing a constant amplifier driving signal;
   an adding circuit connected with the output of said pintle control means, said pintle position detecting means, and said amplifier driving means adapted to provide an output sum signal of voltage indicative of the sum of the voltages for the control voltage output signal, the feedback signal, and the amplifier driving signal;
   means connecting the output of said adding circuit with the input of said first amplifier for inverting and amplifying said sum signal to provide a first amplifier output signal;
   a voltage controlled delay multivibrator circuit;
   a pulse oscillator circuit adapted to provide pulsed input signals to said first voltage controlled delay multivibrator at a constant rate for establishing a pulsed, solenoid driving multivibrator output signal;
   means connecting said first amplifier with said first voltage controlled delay multivibrator for feeding said first amplifier output signal thereto for biasing the first delay multivibrator and dictating the pulse width of the solenoid driving output signal therefrom; and
   a first solenoid driver circuit connected with the output of said first voltage controlled delay multivibrator circuit adapted to respond to said solenoid driving signal for driving open a solenoid valve to control a fluid flow therethrough in accordance with the pulse width of the solenoid driving signal for initiating displacement of said pintle.

References Cited by the Examiner
UNITED STATES PATENTS

| | | | |
|---|---|---|---|
| 2,494,353 | 1/1950 | Newman | 331—144 |
| 2,778,978 | 1/1957 | Drew | 317—149 |
| 3,070,071 | 12/1962 | Cooper | 91—363 |
| 3,140,427 | 7/1964 | Freiberg | 317—155.5 |

MARTIN P. SCHWADRON, *Primary Examiner.*

P. E. MASLOUSKY, *Assistant Examiner.*